Patented Feb. 25, 1941

2,233,042

UNITED STATES PATENT OFFICE 2,233,042

PIGMENT AND PAINT AND METHOD OF MAKING SAME

Louis E. Barton, Windsor, Conn.

No Drawing. Application January 23, 1939, Serial No. 252,440

19 Claims. (Cl. 134—67)

This invention relates to pigments, their preparation and application and more especially to improved opaque white pigments—the silicates of lead—the method of making and stabilizing them and their application in paint.

In principle, this invention is based upon the process of making lead silicate pigments by heating a mixture of lead oxide, or a lead compound which upon heating yields lead oxide, and silica under controlled temperature conditions whereby the reaction to form lead silicate takes place in the solid phase without fusion, thus ensuring a soft fine texture and other desirable physical qualities in the pigment product. By such process any desired lead silicate such as acid lead silicate ($PbSi_2O_5$), normal lead silicate ($PbSiO_3$) and basic lead silicate ($Pb_2SiO_4$) can be prepared and also lead silicates having other proportions which apparently are either mixtures of those definite chemical compounds or in case an excess of either lead oxide or silica has been used the product may contain some free oxide or the excess oxide may exist as a solid solution in the silicate. I have found that lead silicate pigments so prepared are not stable to the action of light, acquiring a gray or gray-brown tone or color in a few hours under the action of direct sunlight or after a longer period in diffused light. All of the lead silicate pigments whether acid, normal or basic, are to some extent unstable to light but I have found that the instability increases with the basicity or content of lead oxide in the pigment. While such lead silicate pigments make paints which are exceptionally durable when exposed to light and weather, the unstable characteristic of the pigment still persists after grinding with drying oil vehicles such as linseed oil, tung oil, and oil varnishes. The resulting white paints upon exposure to light soon acquire a grayish color which gradually becomes darker. Such unstable lead silicate pigments are not available for making white or light-tinted paints.

In my co-pending U. S. patent application Serial No. 244,768 filed December 9, 1938, I have disclosed a process of stabilizing lead silicate pigment such as referred to in the preceding paragraph, which consists in adding, to a mixture of a lead compound and silica, a small amount of a white oxide of one of the elements of group II of the periodic system and then heating the mixture until the ingredients chemically combine in the solid phase without fusion of the charge.

I have now discovered that light-stable lead silicate pigments can be made, which will not darken and discolor when exposed to light, by adding to the mixture of lead compound and silica a small amount of a halogen compound of one of the elements of group II of the periodic system the oxide of which is white, and then heating the mixture until the ingredients chemically combine in the solid phase to form lead silicate without fusion. Of the class of stabilizers referred to I have found the halogen compounds of magnesium, calcium, barium, strontium and zinc particularly satisfactory since they are industrially and economically available.

I have also discovered that small amounts of the halogen compounds of the white-oxide-forming elements of group II of the periodic system not only stabilize the lead silicate pigment against discoloration under the action of light, but also greatly accelerate the reaction between the lead compound and silica when the mixture is heated to form lead silicate in the solid phase and furthermore, the reaction can be completed at lower temperatures than is possible and practicable without such accelerating component.

The use of the stated halogen compounds, having the dual function of accelerating the reaction and stabilizing the reaction product, permits considerable variation in the amount of halogen compound used, the calcination temperature, the time required to complete the reaction and the characteristics of the resulting pigment. Thus it is possible to complete the reaction between the lead compound and silica in the minimum time with relatively more of the halogen compound or with a similar amount to complete the reaction at a lower temperature in a somewhat longer period of time. On the other hand, the pigment may be stabilized with very small amounts of halogen compounds, the time for completion of the reaction depending on the temperature, and thus yielding a stabilized lead silicate pigment having a minimum content of the stabilizing compound. The lower calcination temperatures, permissible when using a halogen compound as accelerator and stabilizer, yield lead silicates of softer texture and improved hiding power.

The mechanism of the reactions whereby small amounts of the halogen compounds referred to, accelerate or catalyze the reaction in the formation of lead silicates and stabilize the resulting products is not definitely known, however the observed reactions which take place during operation of the process should be considered in deciding upon the kind and amount of halogen compound, the calcination temperature and the treatment of the calcined product. Partial decomposition of some of the halogen compounds occurs during heating with the lead compound and silica, with volatilization of some of the halogen—for example, when bromides and iodides are used—and some halogen compounds volatilize partially as such under the heating conditions, for example, zinc chloride; but, regardless of the amount of halogen compound, the greater part of both basic element and halogen remains in the calcined lead silicate. The halogen compound remaining in the calcined lead silicate is partially fixed, apparently in chemical combination, and a part remains water-soluble. The amount of water-soluble compound increases with the amount of halogen compound used, hence if larger amounts of the halogen compounds are used to accelerate the reaction it is preferable to wash the calcined pigment to substantially eliminate such water-soluble compounds. If smaller amounts of the halogen compounds are used they are mostly fixed in the calcined lead silicate. Regardless of the amount of halogen compound used some of both basic element and halogen remains in the finished pigment even though the pigment has been thoroughly washed with water. In view of the complexity of reactions which take place during the preparation and stabilization of the lead silicate pigments it appears impossible to predict with certainty either the amount or form in which either the basic element or halogen is present in the pigment. Of the class of accelerating-stabilizing compounds referred to, all are effective as stabilizers but the fluorides, which are insoluble in water, not easily decomposed and non-volatile at the temperatures used to form the lead silicate, do not greatly accelerate the reaction. The chlorides, bromides and iodides of calcium, barium, magnesium and zinc are very effective both as accelerators and stabilizers but of the three halogens, chlorine having a lower combining weight permits the minimum addition of compound for any desired amount of the basic element. The chlorides are also more economically available.

Preferably I use the accelerating-stabilizing halogen compounds in the proportion of 0.2% to 1% of the lead silicate pigment calculated as bivalent oxide of the basic element, though even smaller amounts will effect stabilization. Such preferred amounts of stabilizing compounds definitely accelerate the reaction; facilitate the use of low reaction temperatures; only slightly change the chemical composition of the lead silicate and yield a stable pigment having a soft texture and good hiding power. Larger amounts of the accelerating-stabilizing compounds, up to 5%, calculated as oxide of the basic element, permit the reaction to be completed in 10 to 15 minutes if desired. The stabilizers should, preferably, not be used in excess of 5% for, while larger amounts are effective, they unnecessarily change the chemical composition of the pigment, reducing the percentage of lead silicate, the characteristic properties of which it is desired to retain.

My method of stabilizing lead silicate pigments can be applied to substantially pure lead silicates of any desired composition. I have discovered that, not only can I make stable lead silicate pigments approximating the regular molecular proportions such as acid lead silicate, $PbSi_2O_5$, normal lead silicate, $PbSiO_3$, and basic lead silicate, $Pb_2SiO_4$, but I can also make equally useful lead silicate with any basicity desired between the regular normal and basic formulae or of any acidity desired between the regular acid and normal formulae. I can also make useful lead silicate pigments containing a higher percentage of silica than the regular acid formula, $PbSi_2O_5$, but, though such a pigment is cheaper, its hiding power is reduced and thus there is a practical limit based upon utility of the product in its application. Such a practical limit appears to be an acid lead silicate containing not less than 85% actual lead silicate calculated as regular acid lead silicate, $PbSi_2O_5$, and about 15% silica plus stabilizer. The excess silica may be chemically combined or in solid solution or, possibly, partially in the free state.

Before giving detail examples showing the operation of my process and characteristics of the various products I shall give some general information relative to the raw materials, process and product.

The material used should be as free from impurities as possible consistent with industrial availability, since small amounts of iron or other impurity tend to discolor the product. Either litharge (PbO) or other oxides of lead such as red lead ($Pb_3O_4$) or lead peroxide ($PbO_2$) may be used as a source of lead. Other lead compounds which yield the oxide upon heating may also be employed, such as white lead $$(2PbCO_3.PbH_2O_2)$$

The silica and stabilizing compounds supplying oxides of magnesium, calcium, barium, zinc, etc. should be as pure as commercially obtainable and preferably should be finely divided to facilitate thorough mixing and blending of the charge.

I first thoroughly mix the materials in the required proportions thereby reducing particle size and also assuring a very close association of the ingredients. The milling may be done either in a batch or a continuous type of mill; in either case by using a porcelain or silex lining to avoid contamination of materials. If desired, the lead compound and silica can be wet-milled and the slurry from the mill dewatered as by settling and decantation and the accelerating-stabilizing halogen compound then added and easily mixed with the charge. But I have found that the water-soluble halogen compounds thus incorporated, while very effective stabilizers, are less effective as accelerators of the reaction than is the case when incorporated by dry-mixing. I attribute this difference in effectiveness of the accelerator to the chemical reactions between the halogen compounds in solution and the lead compound; which reactions apparently must be reversed or substituted during the heating process before the reaction to form lead silicate can be completed. Therefore I prefer to mix the materials including the halogen compound by dry-milling.

Either the wet pulp or a dry mixture is then charged into the heating furnace. The furnace may be either of the batch type such as a muffle, hearth furnace or Bruckner furnace, or of the continuous kiln type. In either case a lining of high-grade fire brick is satisfactory to avoid contamination of materials. Whatever the type of furnace used, means should be provided for control of temperature. In furnaces where products of combustion contact the charge a neutral or oxidizing flame should be maintained to avoid possible reduction of metallic oxides.

Lead oxide and silica react very slowly at a temperature of 500° C. and at 550° C. a white lead silicate pigment can be made by heating for a period of about 48 hours. While such temperatures are obviously impractical for making lead silicates from mixtures of lead compounds and silica only, such low temperature can be used if an accelerating and stabilizing compound of the class before referred to is used. Lead silicates sinter and fuse if the upper limits of temperature range 650° C. for the acid, 680° C. for the normal and 725° C. for the basic lead silicate are exceeded for a considerable length of time. Thus, while my stabilized lead silicate pigments as a class can be made by the use of accelerators in a temperature range from about 500° C. to about 700° C., I prefer to make all of them in a temperature range of 500 to 600° C., since at such temperatures the reaction is fairly rapid and yields a product having a soft texture and improved hiding power.

The time required in the calcining zone of the furnace depends upon the temperature and amount of accelerator used: the higher the temperature within the permissible range the shorter the time, but there is a tendency to clearer color tones at the lower and medium temperatures within that range. The time required to complete the reaction may vary from 10 minutes to several hours but it is usually desirable to hold the charge at the proper temperature a little longer than appears absolutely necessary to insure that the reaction is complete. The progress of the reaction during calcination may be judged by withdrawing a sample from the furnace for inspection. The finished product should be substantially white and should not acquire a yellower or darker color upon milling or grinding the sample in a mortar.

Lead silicate pigments, if not calcined at too high a temperature, are soft in texture and fine enough to be used as pigments for paint, but usually milling is required to break down aggregates, reduce particle size and develop full tinting strength and hiding power of the products. Either dry or wet-milling methods may be used with or without air separation or wet classification respectively, thereby assuring uniformity of product. If the calcined product contains more than 0.1 to 0.2% of water-soluble compounds it is preferable to wet-mill and wash the pigment. The slurry is then dewatered, dried, and if necessary passed through a disintegrator to break down lumps and aggregates.

Examples showing the working of my process and properties of the resulting white lead silicate pigments are shown in Tables I to VII but such examples should not be construed as limiting the application of my process since many other lead silicate pigments can be made within the general limits of proportions and temperatures.

The mixtures were intimately blended in the proportions shown in the tables by dry-milling except in Examples 1, 20 and 21, which were blended by wet-milling.

The Tables I to VII have been arranged for convenience to group the examples, approximately, to show classes of products, reagents and effects, but the examples have been numbered consecutively to facilitate positive reference.

Tables I and II show examples of stabilizing approximately normal lead silicates with compounds of each of the halogens and also with the principal white-oxide-forming elements of group II of the periodic system in combination with halogens; the stabilizing compound being used in larger amount to show the accelerating effect notwithstanding the use of some temperatures lower than practicable without the accelerating compound.

Tables III and IV show the effectiveness of medium and smaller amounts of reaction-accelerating and stabilizing compounds when applied to approximately normal lead silicates.

Table V shows the application of reaction-accelerating and stabilizing compounds in the preparation of basic lead silicates.

Table VI shows the application of reaction-accelerating and stabilizing compounds in the preparation of acid lead silicates. Example 23 shows the application of the method to a more acid lead silicate than $PbSi_2O_5$ as well as the use of a lead compound instead of lead oxide in preparing the pigment. Example 24 shows the application of the method to a lead silicate intermediate in composition between the regular acid and normal products, $PbSi_2O_5$ and $PbSiO_3$.

Table VII, Examples 25 and 26 show, by comparison, the advantage of using a reaction-accelerating and stabilizing compound in the preparation of lead silicate pigments. From Example 25 will be noted the comparatively short period of time required to complete the reaction at the exceptionally low temperature shown and the high tinting-strength of the resulting product.

The examples in the tables show the accelerating effect of halogen compounds by comparison of the time required to complete the reaction in such cases with that required in Examples 1, 20, 21, 26 and 28 in which no accelerator was used; however, such comparison does not indicate the maximum accelerating effect. Acceleration of reaction is more apparent by the rapid development of a white color during the calcination. Thus it was noted that in Examples 2, 3, 6, 7, 8, 17 and 18 the reaction was apparently complete after heating from 10 to 15 minutes, though the heating was actually continued for the longer periods shown in the tables to make sure the reaction was complete.

*Table I*

| | Example No. | | | |
|---|---|---|---|---|
| | 1<br>Normal lead silicate, $PbSiO_3$ | 2 | 3 | 4 |
| Accelerating and stabilizing compound and amount. | None | Calcium chloride, $CaCl_2$ = 3% CaO. | Calcium bromide, $CaBr_2$ = 3% CaO. | Calcium iodide, $CaI_2$ = 3% CaO. |
| Mixture: | | | | |
| Lead oxide | 78.80 | 76.50 | 76.50 | 76.50. |
| Silica | 21.20 | 20.60 | 20.50 | 20.50. |
| Stabilizer | | 5.95 | 11.01 | 15.75. |
| Calcining conditions: | | | | |
| Time _____ hours | 2 | 0.5 | 0.5 | 1. |
| Temp. _____ ° C | 600 to 610 | 525 to 550 | 560 to 580 | 550 to 570. |
| Treatment of calcined product | Wet-milled 1½ hours. | Wet-milled washed and dried. | Wet-milled washed and dried. | Wet-milled washed and dried. |
| Chemical composition: | | | | |
| Lead oxide _____ percent | 78.80 | 75.32 | 73.80 | 74.96. |
| Silica _____ do | 21.20 | 20.27 | 19.81 | 20.20. |
| Stabilizer _____ do | | CaO 2.43<br>Cl 1.98 | CaO 2.18<br>Br 1.21 | CaO 2.04.<br>I 2.80. |
| Specific gravity | 5.80 | | | |
| Tinting strength, white lead standard=100. | 95 | 110 | 105 | 100. |
| Color stability under exposure to light. Dry pigment and pigment ground in oil exposed to sunlight. | Gray in 10 hours | Stable | Stable | Stable. |

Table II

| | Example No. | | | |
|---|---|---|---|---|
| | 5 | 6 | 7 | 8 |
| Accelerating and stabilizing compound and amount. | Calcium fluoride, CaF₂=3% CaO | Barium chloride, BaCl₂.2H₂O =2.5% BaO | Magnesium chloride, MgCl₂ =3% MgO | Zinc chloride, ZnCl₂=3% ZnO. |
| Mixture: | | | | |
|   Lead oxide | 76.50 | 76.90 | 76.50 | 76.50. |
|   Silica | 20.50 | 20.60 | 20.50 | 20.50. |
|   Stabilizer | 4.14 | 4.00 | 7.20 | 5.04. |
| Calcining conditions: | | | | |
|   Time........hours | 3 | 0.5 | 0.5 | 0.5. |
|   Temp.........°C | 630 to 640 | 570 to 590 | 525 to 550 | 525 to 550 |
| Treatment of calcined product. | Dry-milled | Wet-milled, washed and dried. | Wet-milled, washed and dried. | Wet-milled, washed and dried. |
| Chemical composition: | | | | |
|   Lead oxide....percent | 75.74 | 77.05 | 76.60 | 77.15. |
|   Silica............do | 20.17 | 20.65 | 20.62 | 20.80. |
|   Stabilizer......do | CaO 2.96 Fl 1.13 | BaO 1.73 Cl .57 | MgO 1.69 Cl 1.09 | ZnO 1.18 Cl .87. |
| Specific gravity | | | | |
| Tinting strength, white lead standard=100. | 90 | 90 | 105 | 100. |
| Color stability under exposure to light. Dry pigment and pigment ground in oil exposed to sunlight. | Stable | Stable | Stable | Stable. |

Table III

| | Example No. | | | |
|---|---|---|---|---|
| | 9 | 10 | 11 | 12 |
| Accelerating and stabilizing compound and amount. | Calcium chloride, CaCl₂= 1% CaO. | Magnesium chloride, MgCl₂= 1% MgO. | Zinc chloride, ZnCl₂= 1% ZnO. | Calcium chloride, CaCl₂= 0.5% CaO. |
| Mixture: | | | | |
|   Lead oxide | 78.00 | 78.00 | 78.00 | 78.40. |
|   Silica | 21.00 | 21.00 | 21.00 | 21.10. |
|   Stabilizer | 1.98 | 2.40 | 1.68 | .99. |
| Calcining conditions: | | | | |
|   Time........hours | 0.5 | 1 | 1 | 1. |
|   Temp.........°C | 550 to 560 | 550 to 560 | 550 to 560 | 570 to 580. |
| Treatment of calcined product. | Dry-milled | Dry-milled | Dry-milled | Dry-milled. |
| Chemical composition: | | | | |
|   Lead oxide..percent | | | | |
|   Silica............do | | | | |
|   Stabilizer......do | | | | |
| Specific gravity | | | | |
| Tinting strength, white lead standard=100. | 105 | 90 | 95 | 100. |
| Color stability under exposure to light. Dry pigment and pigment ground in oil exposed to sunlight. | Stable | Stable | Stable | Stable. |

Table IV

| | Example No. | | | |
|---|---|---|---|---|
| | 13 | 14 | 15 | 16 |
| Accelerating and stabilizing compound and amount. | Magnesium chloride, MgCl₂= 0.5% MgO. | Zinc chloride, ZnCl₂= 0.5% ZnO. | Calcium chloride, CaCl₂= 0.2% CaO. | Barium chloride, BaCl₂.2H₂O =0.2% BaO. |
| Mixture: | | | | |
|   Lead oxide | 78.40 | 78.40 | 78.40 | 78.40. |
|   Silica | 21.10 | 21.10 | 21.10 | 21.10. |
|   Stabilizer | 1.20 | .84 | .38 | .32. |
| Calcining conditions: | | | | |
|   Time....hours | 1.5 | 1.5 | 2 | 2. |
|   Temp......°C | 600 to 615 | 600 to 615 | 590 to 625 | 620 to 640. |
| Treatment of calcined product. | Dry-milled | Dry-milled | Dry-milled | Dry-milled. |
| Chemical composition: | | | | |
|   Lead oxide percent | | | | |
|   Silica............do | | | CaO, .17 Cl, present* | BaO, .14 Cl, present*. |
|   Stabilizer......do | | | | |
| Specific gravity | | | | |
| Tinting strength, white lead standard=100. | 110 | 105 | 105 | 100. |
| Color stability under exposure to light. Dry pigment and pigment ground in oil exposed to sunlight. | Stable | Stable | Stable | Stable. |

*Presence of chlorine determined by qualitative test.

Table V

| | Example No. | | | |
|---|---|---|---|---|
| | 17 | 18 | 19 | 20 |
| Accelerating and stabilizing compound and amount. | Calcium chloride, $CaCl_2$ =3% CaO | Magnesium chloride, $MgCl_2$ =3% MgO | Zinc chloride, $ZnCl_2$ =0.5% ZnO | Basic lead silicate, $Pb_2SiO_4$. None. |
| Mixture: | | | | |
| Lead oxide | 85.60 | 85.60 | 87.46 | 88.20. |
| Silica | 11.40 | 11.40 | 11.70 | 11.80. |
| Stabilizer | 5.95 | 7.20 | .84 | |
| Calcining conditions: | | | | |
| Time _____ hours | 0.5 | 0.5 | 2 | 2. |
| Temp _____ °C | 540 to 560 | 540 to 560 | 590 to 610 | 665 to 675. |
| Treatment of calcined product | Dry-milled | Dry-milled | Dry-milled | Wet-milled 1½ hours, dewatered and dried. |
| Chemical composition: | | | | |
| Lead oxide _____ percent | | | | 88.20. |
| Silica _____ do | | | | 11.80. |
| Stabilizer _____ do | | | | |
| Specific gravity | | | | 7.03. |
| Tinting strength, white lead standard=100 | 115 | 110 | 110 | 100. |
| Color stability under exposure to light. Dry pigment and pigment ground in oil exposed to sunlight. | Stable | Stable | Stable | Darkened in 2 hours, gray in 10 hours. |

Table VI

| | Example No. | | | |
|---|---|---|---|---|
| | 21 | 22 | 23 | 24 |
| Accelerating and stabilizing compound and amount. | Acid lead silicate, $PbSi_2O_5$. None | Calcium chloride, $CaCl_2$= 0.2% CaO. | Calcium chloride, $CaCl_2$= 0.2% CaO. | Calcium chloride, $CaCl_2$= 0.5% CaO. |
| Mixture: | | | | |
| Lead oxide | 64.80 | 64.80 | W. L. 63.70*= 55.00 PbO | 72.00. |
| Silica | 35.20 | 35.20 | 45.00 | 28.00. |
| Stabilizer | | .40 | .40 | .99. |
| Calcining conditions: | | | | |
| Time _____ hours | 2 | 2 | 2 | 1. |
| Temp _____ °C | 590 to 610 | 575 to 585 | 575 to 585 | 570 to 590. |
| Treatment of calcined product | Wet-milled 1½ hours and dried. | Wet-milled for 1 hour, washed and dried. | Wet-milled for 1 hour washed and dried. | Dry-milled. |
| Chemical composition: | | | | |
| Lead oxide _____ percent | 64.80 | | | |
| Silica _____ do | 35.20 | | | |
| Stabilizer _____ do | | CaO, .16 Cl, present** | CaO, .12 Cl, present** | |
| Specific gravity | 4.68 | | | |
| Tinting strength, white lead standard=100 | 85 | 80 | 75 | 95. |
| Color stability under exposure to light. Dry pigment and pigment ground in oil exposed to sunlight. | Darkened after 10 hours exposure. | Stable | Stable | Stable. |

* White lead, $2PbCO_3.PbH_2O_2$, used to supply lead oxide.
** Presence of chlorine determined by qualitative test.

Table VII

| | Example No. | | | |
|---|---|---|---|---|
| | 25 | 26 | 27 | 28 |
| Accelerating and stabilizing compound and amount. | Barium chloride, $BaCl_2.2H_2O$=2.5% BaO | None | Calcium chloride, $CaCl_2$= 1% CaO. | None. |
| Mixture: | | | | |
| Lead oxide | 76.90 | 78.80 | 84.00 | 85.00. |
| Silica | 20.60 | 21.20 | 16.00 | 15.00. |
| Stabilizer | 4.00 | | 1.98 | |
| Calcining conditions: | | | | |
| Time _____ hours | 5 | 48 | 1 | 3. |
| Temp _____ °C | 500 to 520 | 540 to 560 | 680 to 700 | 680 to 700. |
| Treatment of calcined product | Dry-milled | Dry-milled | Dry-milled | Dry milled. |
| Chemical composition: | | | | |
| Lead oxide _____ percent | | 78.80 | | 85.00. |
| Silica _____ do | | 21.20 | | 15.00. |
| Stabilizer _____ do | | | | |
| Specific gravity | | | | |
| Tinting strength, white lead standard=100 | 140 | 105 | 105 | 100. |
| Color stability under exposure to light. Dry pigment and pigment ground in oil exposed to sunlight. | Stable | Darkened in 4 hours, gray in 12 hours. | Stable | Gray-brown in 24 hours. |

Two classes of white pigments are generally recognized: (1) The opaque white pigments, such as white lead, zinc oxide and titanium pigments which impart opacity and whiteness when mixed with oil or other organic vehicle: and (2) The extender pigments, such as whiting and china clay which do not impart appreciable opacity when similarly mixed with vehicles.

The opaque pigments of class (1) are further sub-divided into two classes: (a) Those which are reactive or capable of combining chemically or physico-chemically with ingredients of the vehicle, such as white lead and zinc oxide: and (b) those which are chemically inert, such as titanium pigments.

It is well known that the reactive pigments have a special value, not possessed by inert pigments, of enhancing certain desirable properties in paints and other products to which they are applied. For example, white lead has the property of combining with linseed oil and other vehicles to form a tough elastic coating which is very resistant to light and weather when spread and exposed. Zinc oxide reacts with oil and other vehicles of paint products to harden the film or coating thereby rendering it more resistant to abrasion as well as improving gloss, and when exposed is more resistant to dirt collection.

My new lead silicate pigments belong to the class of opaque reactive pigments, though they differ in degree of reactivity as indicated by the rate of drying when the pigments are mixed with raw linseed oil and exposed as a paint film.

The properties of my lead silicate pigments adapt them for application to oil, enamel and lacquer type paints and for other purposes where white pigments are used, such as for rubber, linoleum and other floor coverings, printing inks, vitrified enamel, et cetera but I have found them particularly desirable for the preparation of exterior paints.

In the field of paints for exterior use much investigation has been conducted for many years in an effort to combine the best features of the various opaque white pigments, but, while much progress has been made, the improvement in one feature has too often been accompanied by a loss of other desirable properties. Heretofore white lead carbonate appears to have been the only white opaque pigment which, without admixture of other pigments, will make a reasonably satisfactory exterior paint. Zinc oxide desirably hardens the paint film, but when used without admixture of other pigments will check and crack: admixture with white lead is the usual practice. Lithopone pigment because chemically unstable to atmospheric influences fails rapidly and is little used in high-grade exterior paints. Titanium pigments are in great demand for their excellent hiding power, but fail rapidly by chalking when used alone in exterior paints. The manufacturers of paints now recommend admixture of titanium pigments with white lead, zinc oxide or both, thus improving the paint to a certain extent. However, titanium pigments with white lead and linseed oil vehicle while durable, rapidly accumulate dirt and mildew. The addition of zinc oxide prevents dirt collection and mildew, but in a short time chalking takes place with consequent fading of tinted paints. Chalking and fading of tinted paints also occurs within a short time when mixtures of titanium pigments and zinc oxide are used with a linseed oil vehicle.

From what I have heretofore stated about white lead silicate pigments, it is evident that hiding power, being in most cases in the order of white lead in that respect, is not of special importance, though the hiding power is sufficient to make paints which will cover or hide the surface with the usual number of coats. The outstanding characteristic of lead silicate pigments is their capacity to impart durability to paints.

I have discovered that paints made with my lead silicate pigments ground with raw linseed oil vehicle are exceptionally durable as regards gloss retention and resistance to checking and chalking of the paint film and are remarkably free from dirt collection and mildew. I have also discovered that these characteristics are imparted to paints containing mixtures of pigments one of which is a lead silicate. Thus combinations of lead silicate with titanium pigments largely prevent the chalking, fading of tints, loss of gloss and dirt collection to which titanium paints are subject and prevent checking and cracking when combined with either zinc oxide or lithopone pigments. The chalking which takes place with white lead paints is also retarded.

The cleanness of surface and freedom from dirt collection and mildew of paints containing lead silicate I attribute to the reactive properties of the pigment resulting in paint films which dry to a relatively harder surface.

For exterior paints made with mixed pigments and raw linseed oil vehicle, I prefer to have the lead silicate about 50% of the pigment combination, but lesser amounts may be used with good results and improvement roughly proportional to the percentage used. I have also found the improvement of paints when lead silicate is added to a plurality of pigments, either a mixture of opaque pigments or a mixture containing a colored or tinting pigment or an extender pigment which is often added to increase the pigment volume concentration or to cheapen the paint.

I have furthermore discovered that lead silicates, especially basic lead silicates, give remarkable protection to iron and steel under exposure to light, weather and other influence. This result I attribute to the reactive nature of the pigments, the lead silicates functioning like free oxides of lead such as red lead which for many years has been used with linseed oil as paint where maximum protection of iron or steel is desired.

I claim as my invention:

1. The method of making a substantially pure, white, anhydrous, light-stable lead silicate pigment, which consists in intimately mixing lead oxide, silica and a halide of an element of group II of the periodic system the oxide of which is white, and then heating the mixture at a temperature sufficiently high to chemically combine the ingredients in the solid phase without fusion to form said stabilized lead silicate pigment.

2. The method of making a substantially pure, white, anhydrous, light-stable lead silicate pigment, which consists in intimately mixing a lead compound which upon heating yields lead oxide, silica and a halide of an element of group II of the periodic system the oxide of which is white, and then heating the mixture at a temperature sufficiently high to chemically combine the ingredients in the solid phase without fusion to form said stabilized lead silicate pigment.

3. The method of making a substantially pure, white, anhydrous, light-stable lead silicate pigment which consists in intimately mixing lead oxide, silica and a halide of one of the elements, magnesium, calcium, barium, strontium and zinc in amount equivalent to not over 3% of the bivalent oxide of the element, and then heating the mixture in the temperature range 500 to 725° C. until the ingredients chemically combine in the solid phase without fusion to form said stabilized lead silicate pigment.

4. The method of making a substantially pure, white, anhydrous, light-stable lead silicate pigment which consists in intimately mixing lead oxide, silica and magnesium chloride in amount equivalent to not over 3% MgO and then heating the mixture in the temperature range 500 to 725° C. until the ingredients chemically combine in the solid phase without fusion to form said stabilized lead silicate pigment.

5. The method of making a substantially pure, white, anhydrous, light-stable lead silicate pigment which consists in intimately mixing lead oxide, silica and calcium chloride in amount equivalent to not over 3% CaO and then heating the mixture in the temperature range 500 to 725° C. until the ingredients chemically combine in the solid phase without fusion to form said stabilized lead silicate pigment.

6. The method of making a substantially pure, white, anhydrous, light-stable lead silicate pigment which consists in intimately mixing lead oxide, silica and barium chloride in amount equivalent to not over 3% BaO and then heating the mixture in the temperature range 500 to 725° C. until the ingredients chemically combine in the solid phase without fusion to form said stabilized lead silicate pigment.

7. In the preparation of a substantially pure, white, anhydrous, lead silicate pigment, the method of accelerating the reaction between lead oxide and silica in the solid phase, which consists in intimately mixing lead oxide, silica and a water-soluble halide of an element of group II of the periodic system the oxide of which is white, and then heating the mixture at a temperature sufficiently high to form the lead silicate pigment without fusion.

8. In the preparation of a substantially pure, white, anhydrous lead silicate pigment, the method of accelerating the reaction between lead oxide and silica in the solid phase, which consists in intimately mixing a lead compound which upon heating yields lead oxide, silica and a water-soluble halide of one of the elements, magnesium, calcium, barium, strontium and zinc in amount equivalent to not more than 3% of bi-valent oxide of the element, and then heating the mixture in the temperature range 500 to 725° C. to form the lead silicate pigment.

9. In the preparation of a substantially pure, white, anhydrous lead silicate pigment, the method of accelerating the reaction between lead oxide and silica in the solid phase, which consists in intimately mixing lead oxide, silica and magnesium chloride in amount equivalent to not over 3% MgO, and then heating the mixture in the temperature range 500 to 725° C. to form the lead silicate.

10. In the preparation of a substantially pure, white, anhydrous lead silicate pigment, the method of accelerating the reaction between lead oxide and silica in the solid phase, which consists in intimately mixing lead oxide, silica and calcium chloride in amount equivalent to not over 3% CaO, and then heating the mixture in the temperature range 500 to 725° C. to form the lead silicate.

11. In the preparation of a substantially pure, white, anhydrous lead silicate pigment, the method of accelerating the reaction between lead oxide and silica in the solid phase, which consists in intimately mixing lead oxide, silica and barium chloride in amount equivalent to not over 3% BaO, and then heating the mixture in the temperature range 500 to 725° C. to form the lead silicate.

12. The method of making a substantially pure, white, anhydrous, light-stable lead silicate pigment, which consists in intimately mixing a lead compound which upon heating will supply to the product only lead oxide, silica and a halide of an element of group II of the periodic system the oxide of which is white, and then heating the mixture at a temperature sufficiently high to chemically combine the ingredients in the solid phase without fusion to form said stabilized lead silicate pigment.

13. In the preparation of a substantially pure, white, anhydrous, lead silicate pigment, the method of accelerating the reaction between lead oxide and silica in the solid phase, which consists in intimately mixing a lead compound which upon heating will supply to the product only lead oxide, silica and a water-soluble halide of an element of group II of the periodic system the oxide of which is white, and then heating the mixture at a temperature sufficiently high to form the lead silicate pigment without fusion.

14. The method of making a substantially pure, white, anhydrous, light-stable lead silicate pigment, which consists in intimately mixing a lead compound which upon heating will supply to the product only lead oxide, silica and a halide of an element of group II of the periodic system the oxide of which is white, heating the mixture at a temperature sufficiently high to chemically combine the ingredients in the solid phase without fusion to form said stabilized lead silicate pigment and finally washing the calcined product to remove excess water-soluble compounds.

15. A substantially pure, anhydrous, light-stable, opaque, white pigment consisting essentially of lead silicate and containing a chemically combined element of group II of the periodic system the oxide of which is white, in amount equivalent to not over 3% of the bi-valent oxide of the element and also containing a chemically combined halogen in amount not greater than the chemical equivalent of the said element.

16. A substantially pure, anhydrous, light-stable, opaque, white pigment consisting essentially of lead silicate and containing chemically combined magnesium in amount equivalent to not over 3% MgO and chemically combined chlorine in amount not greater than the chemical equivalent of the magnesium.

17. A substantially pure, anhydrous, light-stable, opaque, white pigment consisting essentially of lead silicate and containing chemically combined calcium in amount equivalent to not over 3% CaO and chemically combined chlorine in amount not greater than the chemical equivalent of the calcium.

18. A substantially pure, anhydrous, light-stable, opaque, white pigment consisting essentially of lead silicate and containing chemically combined barium in amount equivalent to not over 3% BaO and chemically combined chlorine in amount not greater than the chemical equivalent of the barium.

19. A substantially pure, anhydrous, light-stable, opaque, white pigment consisting essentially of lead silicate and containing 55 to 87% lead oxide, a chemically combined element from the group magnesium, calcium, barium, strontium and zinc in amount equivalent to not over 3% of the bi-valent oxide of the element, a chemically combined halogen in amount not greater than the chemical equivalent of the said element and the balance silica.

LOUIS E. BARTON.